United States Patent
Sato

(10) Patent No.: US 8,899,015 B2
(45) Date of Patent: Dec. 2, 2014

(54) CATALYST DEGRADATION DETECTION DEVICE

(75) Inventor: Makoto Sato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 83 days.

(21) Appl. No.: 13/578,501

(22) PCT Filed: Mar. 9, 2010

(86) PCT No.: PCT/JP2010/053835
§ 371 (c)(1),
(2), (4) Date: Aug. 10, 2012

(87) PCT Pub. No.: WO2011/111156
PCT Pub. Date: Sep. 15, 2011

(65) Prior Publication Data
US 2012/0317960 A1    Dec. 20, 2012

(51) Int. Cl.
*F01N 3/00* (2006.01)
*F01N 11/00* (2006.01)
*F02D 41/24* (2006.01)
*F02D 41/02* (2006.01)
*F02D 41/14* (2006.01)

(52) U.S. Cl.
CPC .... *F02D 41/0295* (2013.01); *F02D 2200/0814* (2013.01); *F01N 11/007* (2013.01); *F02D 2200/0816* (2013.01); *F02D 41/1441* (2013.01); *F01N 2550/02* (2013.01); *F02D 41/2454* (2013.01); *Y02T 10/47* (2013.01); *F01N 2560/025* (2013.01)
USPC .................... 60/277; 60/276; 60/285; 60/286

(58) Field of Classification Search
USPC ................... 60/276, 277, 285, 286
See application file for complete search history.

(56) References Cited

U.S. PATENT DOCUMENTS

| 6,976,382 | B2 | 12/2005 | Kadowaki et al. | |
|---|---|---|---|---|
| 7,257,944 | B2 * | 8/2007 | Lewis et al. | 60/285 |
| 7,779,621 | B2 * | 8/2010 | Takubo | 60/285 |
| 8,069,652 | B2 * | 12/2011 | Iihoshi et al. | 60/285 |
| 8,522,531 | B2 * | 9/2013 | Matsumoto et al. | 60/277 |
| 8,534,046 | B2 * | 9/2013 | Miyamoto et al. | 60/277 |
| 8,555,614 | B2 * | 10/2013 | Sato | 60/277 |

FOREIGN PATENT DOCUMENTS

| JP | 9310636 A | 12/1997 |
|---|---|---|
| JP | 2003247451 A | 9/2003 |
| JP | 2004003405 A | 1/2004 |
| JP | 2005098205 A | 4/2005 |
| JP | 2006291773 A | 10/2006 |
| JP | 2009299541 A | 12/2009 |

* cited by examiner

*Primary Examiner* — Binh Q Tran
(74) *Attorney, Agent, or Firm* — Gifford, Krass, Sprinkle, Anderson & Citkowski, P.C.

(57) ABSTRACT

A catalyst degradation detection device, determines whether a three-way catalyst has degraded on the basis of the maximum value of the amount of oxygen stored by the catalyst. When determining whether the three-way catalyst has degraded, the amount of stored oxygen is calculated, and the responsiveness of change in the output signal of an oxygen sensor to oxygen concentration change in catalyst-downstream exhaust is measured. Then, on the basis of the responsiveness of the oxygen sensor which measured the oxygen storage amount, the oxygen storage amount is corrected by reducing the same such that the worsened the measured responsiveness relative to a reference value, the greater the reduction in the oxygen storage amount used in determining whether the three-way catalyst has degraded. The corrected oxygen storage amount used is prevented from deviating from the correct value on the basis of a worsening of the responsiveness of the oxygen sensor.

4 Claims, 6 Drawing Sheets

Fig.4(a)
Air-Fuel Ratio

Fig.4(b)
Output of Air-Fuel Ratio Sensor

Fig.4(c)
Oxygen Storage Amount

Fig.4(d)
Output of Oxygen Sensor

Fig.5(a)
Air-Fuel Ratio

Fig.5(b)
Output of Air-Fuel Ratio Sensor

Fig.5(c)
Oxygen Storage Amount

Fig.5(d)
Output of Oxygen Sensor

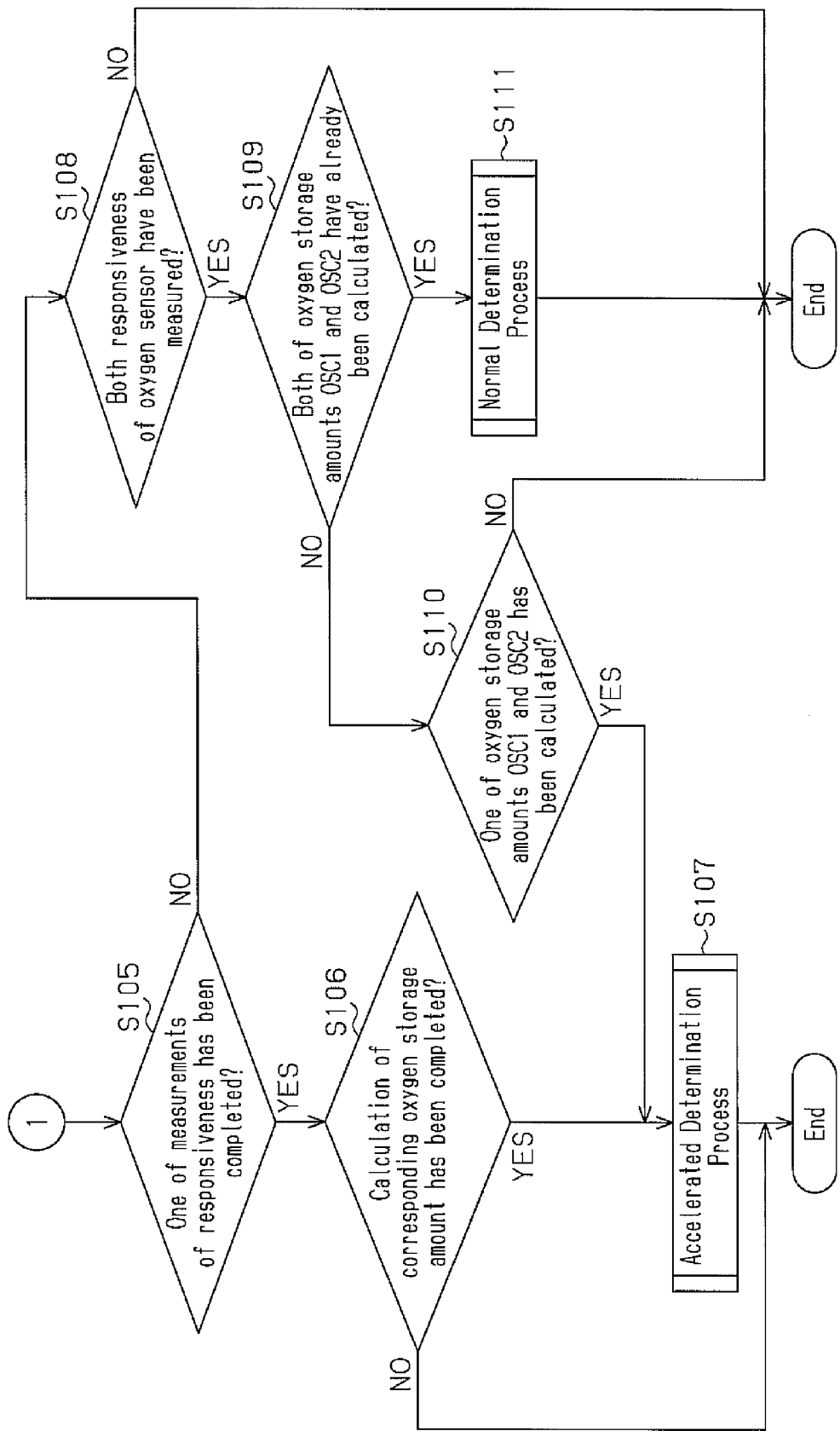

Air-Fuel Ratio

Output of Catalyst Upstream Sensor

Oxygen Storage Amount

Output of Catalyst Downstream Sensor

CATALYST DEGRADATION DETECTION DEVICE

FIELD OF THE DISCLOSURE

The invention relates to a catalyst degradation detection device.

BACKGROUND OF THE DISCLOSURE

An internal combustion engine mounted in a vehicle, such as an automobile, has an exhaust gas purifying catalyst provided in an exhaust passage so that NOx, HC, and CO of exhaust gas flowing through the exhaust passage are purified by the catalyst. To effectively purify these three components in the exhaust gas, the catalyst is equipped with an oxygen storage function, and stoichiometric air-fuel ratio control is executed to control an air-fuel ratio of air fuel mixture in the combustion chamber of the internal combustion engine to a stoichiometric air fuel ratio.

The oxygen storage function of a catalyst refers to a function that enables oxygen in the exhaust gas to be stored in the catalyst and the oxygen stored in the catalyst to be desorbed from the catalyst and released into the exhaust gas, in accordance with the oxygen concentration in exhaust gas passing through the catalyst. More specifically, when the oxygen concentration in the exhaust gas is higher than the value at the time of combustion of the air fuel mixture in the combustion chamber under the condition that the air-fuel ratio of the air fuel mixture is set to the stoichiometric air-fuel ratio, in other words, when the air fuel mixture in the combustion chamber is combusted at a leaner air-fuel ratio than the stoichiometric air-fuel ratio, oxygen in the exhaust gas passing through the catalyst is stored in the catalyst by the oxygen storage function of the catalyst. On the other hand, when the oxygen concentration in the exhaust gas is lower than the value at the time of combustion of the air fuel mixture in the combustion chamber under the condition that the air-fuel ratio of the air fuel mixture is set to the stoichiometric air-fuel ratio, in other words, when the air fuel mixture in the combustion chamber is combusted at a richer air-fuel ratio than the stoichiometric air-fuel ratio, the oxygen stored in the catalyst is desorbed therefrom and released into the exhaust gas by the oxygen storage function of the catalyst.

The stoichiometric air-fuel ratio control regulates a fuel injection amount of the internal combustion engine in accordance with the oxygen concentration in the exhaust gas, so that the oxygen concentration in the exhaust gas becomes equal to the value at the time of combustion of the air fuel mixture in the combustion chamber under the condition that the air-fuel ratio of the air fuel mixture is set to the stoichiometric air-fuel ratio. As disclosed in Patent Document 1, the stoichiometric air-fuel ratio control uses a catalyst upstream sensor and a catalyst downstream sensor provided on upstream and downstream sides of a catalyst in an exhaust passage, respectively. The catalyst upstream sensor is provided on the upstream side of the catalyst in the exhaust passage to output signals on the basis of the oxygen concentration in the exhaust gas. The catalyst downstream sensor is provided on the downstream side of the catalyst in the exhaust passage to output signals on the basis of the oxygen concentration in the exhaust gas.

According to the stoichiometric air-fuel ratio control using the catalyst upstream sensor and catalyst downstream sensor, the fuel injection amount of the internal combustion engine is regulated on the basis of the signal output from the catalyst upstream sensor, such that the oxygen concentration in the exhaust gas becomes equal to the value at the time of combustion of the air fuel mixture in the combustion chamber under the condition that the air-fuel ratio of the air fuel mixture is set to the stoichiometric air-fuel ratio. Accordingly, the air-fuel ratio of the air fuel mixture in the combustion chamber of the internal combustion engine, while fluctuating in a rich-lean-rich-lean sequence, is controlled to finally converge to the stoichiometric air-fuel ratio. However, when the fuel injection amount is regulated on the basis of the signal output from the catalyst upstream sensor alone, there is still a risk that a fluctuation center when the air-fuel ratio of the internal combustion engine fluctuates in a rich-lean-rich-lean sequence to converge to the stoichiometric air-fuel ratio as described above deviates from the stoichiometric air-fuel ratio due to, for example, manufacturing variability of the sensor. To correct such a deviation, the fuel injection amount of the internal combustion engine regulated according to the signal output from the catalyst upstream sensor is further regulated according to the signal output from the catalyst downstream sensor to ensure that the rich-lean-rich-lean fluctuation of the air-fuel ratio in the internal combustion engine is centered on the stoichiometric air-fuel ratio.

Because of the oxygen storage function provided in the catalyst and the stoichiometric air-fuel ratio control, three components in the exhaust gas, NOx, HC, and CO can be effectively purified. More specifically, when the air-fuel ratio of the air fuel mixture in the combustion chamber fluctuates to become lean during the stoichiometric air-fuel ratio control, the oxygen concentration in the exhaust gas passing through the catalyst is higher than the value at the time of combustion of the air fuel mixture in the combustion chamber under the condition that the air-fuel ratio of the air fuel mixture is set to the stoichiometric air-fuel ratio. Therefore, oxygen in the exhaust gas passing through the catalyst is stored in the catalyst to reduce NOx in the exhaust gas. On the other hand, when the air-fuel ratio of the air fuel mixture in the combustion chamber fluctuates to become rich during the stoichiometric air-fuel ratio control, the oxygen concentration in the exhaust gas is lower than the value at the time of combustion of the air fuel mixture in the combustion chamber under the condition that the air-fuel ratio of the air fuel mixture is set to the stoichiometric air-fuel ratio. Therefore, the oxygen stored in the catalyst is desorbed therefrom to oxidize HC and CO in the exhaust gas. Thus, while the air-fuel ratio of the air fuel mixture in the combustion chamber is fluctuating from rich to lean or from lean to rich before converging to the stoichiometric air-fuel ratio during the stoichiometric air-fuel ratio control, the three components in the exhaust gas, NOx, HC, and CO, are effectively purified.

The oxygen storage function of a catalyst increasingly declines as the catalyst is degrading with time. Therefore, there has been proposed that a maximum value of the amount of oxygen to be stored in the catalyst (hereinafter, simply referred to as oxygen storage amount) is calculated to determine whether the catalyst has degraded. The following steps are carried out to determine whether the catalyst has degraded.

When a rich-to-lean or lean-to-rich change is forced to occur in the air-fuel ratio of the air fuel mixture combusted in the combustion chamber of the internal combustion engine as illustrated in FIG. 8(a) (point in time ta), a corresponding change occurs in the signal of the catalyst upstream sensor as illustrated in FIG. 8(b) (tb). During a period from the occurrence of the corresponding change in the signal of the catalyst upstream sensor to the occurrence of a change corresponding to the change of the air-fuel ratio in the signal of the catalyst downstream sensor (tb-td), the amount of oxygen stored in the catalyst or the amount of oxygen desorbed from the catalyst is calculated. It is possible to determine that the change corresponding to the change of the air-fuel ratio has occurred in the signal of the catalyst downstream sensor when the signal reaches a determination value H, which is used to determine such a change, as illustrated with a solid line in FIG. 8(d).

When the rich-to-lean change is forced to occur in the air-fuel ratio, oxygen is stored in the catalyst during the period (tb-td). Then, the amount of oxygen stored in the catalyst during the period is calculated, and the oxygen amount calculated is then used as the oxygen storage amount of the catalyst. The oxygen storage amount thus calculated changes as illustrated with a solid line during the period (tb-td) in FIG. 8(c). When the lean-to-rich change is forced to occur in the air-fuel ratio, on the other hand, oxygen is desorbed from the catalyst during the period (tb-td). Then, the amount of oxygen desorbed from the catalyst during the period is calculated, and the oxygen amount calculated is then used as the oxygen storage amount of the catalyst. The oxygen storage amount thus calculated also changes as illustrated with a solid line during the period (tb-td) in FIG. 8(c).

To determine whether the catalyst has degraded, the oxygen storage amount obtained at the end of the period (tb-td) is compared to a threshold value for degradation assessment. When the oxygen storage amount is smaller than the threshold value, it is possible to determine that degradation of the oxygen storage function due to degradation of the catalyst has occurred, therefore, it is determined that the catalyst has degraded. When the oxygen storage amount is equal to or larger than the threshold value, on the other hand, it is possible to determine that degradation of the oxygen storage function due to degradation of the catalyst has not occurred, therefore, it is determined that the catalyst is not yet degraded (normal).

PRIOR ART DOCUMENT

Patent Document

Patent Document 1: Japanese Laid-Open Patent Publication No. 2003-247451 (paragraphs [0002], [0016], [0027], [0030], and FIG. 4)

SUMMARY OF THE INVENTION

Problems that the Invention is to Solve

To determine whether the catalyst has degraded as described above, the oxygen storage amount calculated and used to determine the degradation is obtained as a value at the end of the period from the occurrence of the change corresponding to the change of the air-fuel ratio in the signal of the catalyst upstream sensor to the occurrence of the change corresponding to the change of the air-fuel ratio in the signal of the catalyst downstream sensor when the rich-to-lean or lean-to-rich change is forced occur in the air-fuel ratio of the internal combustion engine. Therefore, the oxygen storage amount may deviate from a correct value under the influence of deterioration of responsiveness of the signal output from the catalyst downstream sensor to the change of oxygen concentration in the exhaust gas on the catalyst downstream side. When, for example, deterioration of the responsiveness of the catalyst downstream sensor is exhibited in the output signal of the sensor in the form of a change from the transition illustrated with a solid line to the transition illustrated with a line formed by a long dash alternating with two short dashes in FIG. 8(d), the period during which the oxygen storage amount is calculated, which is originally tb-td, becomes longer to tb-tf. Then, the oxygen storage amount calculated at the end of the period (tb-tf) is too large (value at the point in time tf) as illustrated with a line formed by a long dash alternating with two short dashes in FIG. 8(c) relative to the correct value (value at the point in time td). Thus, determining whether the catalyst has degraded on the basis of deviation of the oxygen storage amount from the correct value may be incorrect.

It is disclosed in Patent Document 1 that a lean response time is measured as responsiveness of the signal output from the catalyst downstream sensor to the rich-to-lean change and a rich response time is measured as responsiveness of the signal output from the catalyst downstream sensor to the lean-to-rich change. The lean response time, when applied to the illustration of FIG. 8, corresponds to a period of time from the point in time tb to the point in time td (or tf) when the rich-to-lean change of the air-fuel ratio of the internal combustion engine is forced to occur. The rich response time, when applied to the illustration of FIG. 8, corresponds to a period of time from the point in time tb to the point in time td (or tf) when the lean-to-rich change of the air-fuel ratio of the internal combustion engine is forced to occur.

Accordingly, it is an objective of the invention to provide a catalyst degradation detection device capable of accurately determining whether a catalyst is degraded when responsiveness of a signal output from a catalyst downstream sensor is deteriorated.

Means for Solving the Problems

To achieve the above objective, a catalyst degradation detection device according to the invention includes a calculating unit for calculating an oxygen storage amount, which is used to determine whether a catalyst is degraded, by forcing at least one of a rich-to-lean change and a lean-to-rich change to occur in an air-fuel ratio of an internal combustion engine. The oxygen storage amount obtained as described above is calculated by using a catalyst downstream sensor in response to a change in an oxygen concentration in exhaust gas on a downstream side of the catalyst. Therefore, the oxygen storage amount thus calculated may deviate from a correct value under the influence from deterioration of responsiveness of a change in a signal output from the sensor. Taking into consideration the above problem, the catalyst degradation detection device further includes a measuring unit to measure responsiveness of a change in the signal output from the catalyst downstream sensor in response to the change in oxygen concentration in the exhaust gas on the downstream side of the catalyst. After the measuring unit measures one of the responsiveness of the catalyst downstream sensor at the time of the lean-to-rich change in the air-fuel ratio of the internal combustion engine and the responsiveness of the catalyst downstream sensor at the time of the rich-to-lean change in the air-fuel ratio, a correcting unit corrects the oxygen storage amount calculated by the calculating unit on the basis of the measured responsiveness alone. The oxygen storage amount thus corrected is prevented from deviating from a correct value under the influence from deterioration of the responsiveness of the change in the signal output from the catalyst downstream sensor. Then, a determining unit determines whether the catalyst has degraded on the basis of the corrected oxygen storage amount. Therefore, the determination result obtained by the determining unit is accurate regardless of the responsiveness of the output signal of the catalyst downstream sensor.

According to one aspect of the invention, the measuring unit measures the responsiveness of the catalyst downstream sensor as specifically described below. That is, the measuring unit measures a rich-to-lean responsiveness of the signal output from the catalyst downstream sensor at the time of the rich-to-lean change in the air-fuel ratio of the internal combustion engine and a lean-to-rich responsiveness of the signal output from the catalyst downstream sensor at the time of the lean-to-rich change in the air-fuel ratio of the internal combustion engine. The calculating unit calculates the oxygen storage amount as specifically described below. That is, the calculating unit calculates the amount of oxygen stored in the catalyst when the rich-to-lean change is forced to occur in the air-fuel ratio of the internal combustion engine as an oxygen storage amount at the time of oxygen storage. Further, the calculating unit calculates the amount of oxygen desorbed from the catalyst when the lean-to-rich change is forced to occur in the air-fuel ratio of the internal combustion engine as an oxygen storage amount at the time of oxygen desorption. The oxygen storage amount obtained at the time of oxygen storage is corrected on the basis of the rich-to-lean responsiveness of the catalyst downstream sensor. The oxygen storage amount obtained at the time of oxygen desorption is corrected on the basis of the lean-to-rich responsiveness of the catalyst downstream sensor.

To accurately determine whether the catalyst has degraded, the determination of whether the catalyst has degraded is preferably made on the basis of a corrected value of the oxygen storage amount obtained at the time of oxygen storage and a corrected value of the oxygen storage amount obtained at the time of oxygen desorption. However, it is inevitably time-consuming to determine whether the catalyst has degraded in this manner because it takes a large amount of time to measure the rich-to-lean responsiveness of the catalyst downstream sensor used to correct the oxygen storage amount obtained at the time of oxygen storage and the lean-to-rich responsiveness of the catalyst downstream sensor used to correct the oxygen storage amount obtained at the time of oxygen desorption. Further, one of the rich-to-lean responsiveness and the lean-to-rich responsiveness is quite possibly measured more frequently than the other. This may create such a situation where one of the rich-to-lean responsiveness and the lean-to-rich responsiveness fails to be measured by the time when the measurement of the other is completed. Therefore, it requires a great deal of time to complete these two responsiveness measurements.

Taking into consideration the above situation, to be able to promptly complete the determination of whether the catalyst has degraded, the determination of whether the catalyst has degraded should be made as described below. That is, when the measurement of one of the rich-to-lean responsiveness and the lean-to-rich responsiveness of the catalyst downstream sensor has already been completed, whether the catalyst has degraded is determined by comparing the oxygen storage amount corrected on the basis of the already measured responsiveness to a threshold value. If the measurement of one of the rich-to-lean responsiveness and the lean-to-rich responsiveness of the catalyst downstream sensor has already been completed, the oxygen storage amount can be corrected on the basis of the measured responsiveness and the corrected oxygen storage amount can be used to determine whether the catalyst has degraded. Therefore, it is not as time-consuming to complete the determination of whether the catalyst has degraded as to measure both the rich-to-lean responsiveness and the lean-to-rich responsiveness of the catalyst downstream sensor for the determination. Therefore, the determination of whether the catalyst has degraded can be promptly completed.

According to one aspect of the invention, in the case where the measurements of the rich-to-lean responsiveness and the lean-to-rich responsiveness of the catalyst downstream sensor are both completed but only one of the calculation of the oxygen storage amount at the time of oxygen storage and the oxygen storage amount at the time of oxygen desorption is completed, the determining unit determines whether the catalyst has degraded as described below. That is, the determining unit compares the oxygen storage amount corrected on the basis of the responsiveness of the catalyst downstream sensor for the oxygen storage amount already calculated to a threshold value to determine whether the catalyst has degraded on the basis of a comparison result thus obtained. When the rich-to-lean responsiveness and the lean-to-rich responsiveness of the catalyst downstream sensor both have already been measured, whether the catalyst has degraded can be determined if at least one of the oxygen storage amount obtained at the time of oxygen storage and the oxygen storage amount at the time of oxygen desorption has already been measured. Thus, whether the catalyst has degraded can be promptly determined after the rich-to-lean responsiveness and the lean-to-rich responsiveness of the catalyst downstream sensor are both measured; therefore the determination can be promptly completed.

According to one aspect of the invention, when the measurements of the rich-to-lean responsiveness and the lean-to-rich responsiveness of the catalyst downstream sensor are both completed and the calculation of the oxygen storage amount at the time of oxygen storage and the calculation of the oxygen storage amount at the time of oxygen desorption are also completed, the determining unit determines whether the catalyst has degraded as described below. That is, the determining unit compares a corrected value of the oxygen storage amount at the time of oxygen storage corrected on the basis of the rich-to-lean responsiveness of the catalyst downstream sensor to the threshold value and compares a corrected value of the oxygen storage amount at the time of oxygen desorption corrected on the basis of the lean-to-rich responsiveness of the catalyst downstream sensor to the threshold value. Then, whether the catalyst has degraded is determined on the basis of comparison results thus obtained. Since the corrected value of the oxygen storage amount obtained at the time of oxygen storage and the corrected value of the oxygen storage amount obtained at the time of oxygen desorption are both used to determine whether the catalyst has degraded, a determination result thus obtained can be accurate.

BRIEF DESCRIPTION OF THE DRAWINGS

FIGS. 4(*a*) to 4(*d*) are timing charts illustrating changes in the air-fuel ratio of the engine, the output signal of the air-fuel ratio sensor, the obtained oxygen storage amount, and the output signal of the oxygen sensor during active air-fuel ratio control, respectively;

FIGS. 5(a) to 5(d) are timing charts illustrating changes in the air-fuel ratio of the engine, the output signal of the air-fuel ratio sensor, the obtained oxygen storage amount, and the output signal of the oxygen sensor during active air-fuel ratio control, respectively;

FIG. 7 is a flowchart illustrating process for determining whether the three-way catalyst has degraded.

DETAILED DESCRIPTION OF THE PREFERRED EMBODIMENTS

Hereinafter, an automobile engine according to one embodiment of the invention will be described referring to FIGS. 1 to 7.

Figure 1:
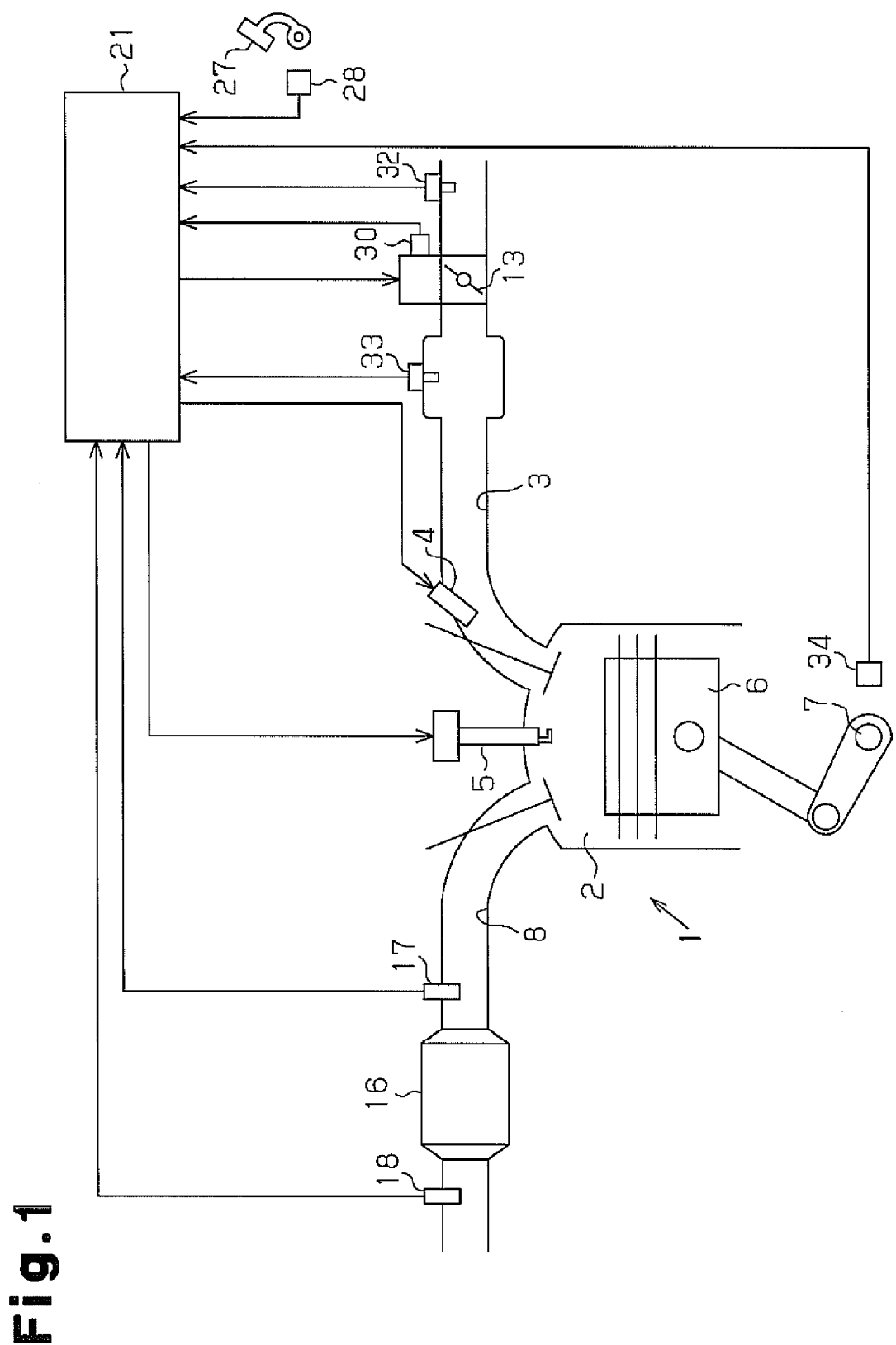
FIG. 1 is a schematic diagram illustrating an overall structure of an engine to which a catalyst degradation detection device according to one embodiment is applied.

An engine 1 illustrated in FIG. 1 has a throttle valve 13 adapted to open and close in an air intake passage 3 connected to a combustion chamber 2. Air is drawn into the combustion chamber 2 through the air intake passage 3, and fuel injected from a fuel injection valve 4 is supplied to the combustion chamber 2 through the air intake passage 3. Air fuel mixture of gas and fuel supplied to the combustion chamber 2 is ignited by an ignition plug 5 to be combusted. When the air fuel mixture is thus combusted in the combustion chamber 2, a piston 6 reciprocates and a crankshaft 7, which is an output shaft of the engine 1, is rotated.

The air fuel mixture after being combusted in the combustion chamber 2 is discharged from the combustion chamber 2 as exhaust gas and flows into an exhaust passage 8. The exhaust gas passing through the exhaust passage 8 is released outside after harmful components, HC, CO, and NOx, contained in the exhaust gas are purified by a three-way catalyst of a catalyst converter 16 provided in the exhaust passage 8. The three-way catalyst has an oxygen storage function to effectively remove the three components in the exhaust gas. Because of the oxygen storage function provided in the three-way catalyst and the stoichiometric air-fuel ratio control, which controls the air-fuel ratio of the air fuel mixture to a stoichiometric air-fuel ratio so that an oxygen concentration in a catalytic atmosphere converges to a value at the time of combustion of the air fuel mixture at the stoichiometric air-fuel ratio, the three components in the exhaust gas, NOx, HC, and CO, are effectively purified by the three-way catalyst.

In the exhaust passage 8, an air-fuel ratio sensor 17 is provided on an upstream side of the catalyst converter 16 as a catalyst upstream sensor, which outputs signals on the basis of an oxygen concentration in the exhaust gas, and an oxygen sensor 18 is provided on a downstream side of the catalyst converter 16 as a catalyst downstream sensor, which outputs signals on the basis of the oxygen concentration in the exhaust gas.

Figure 2:
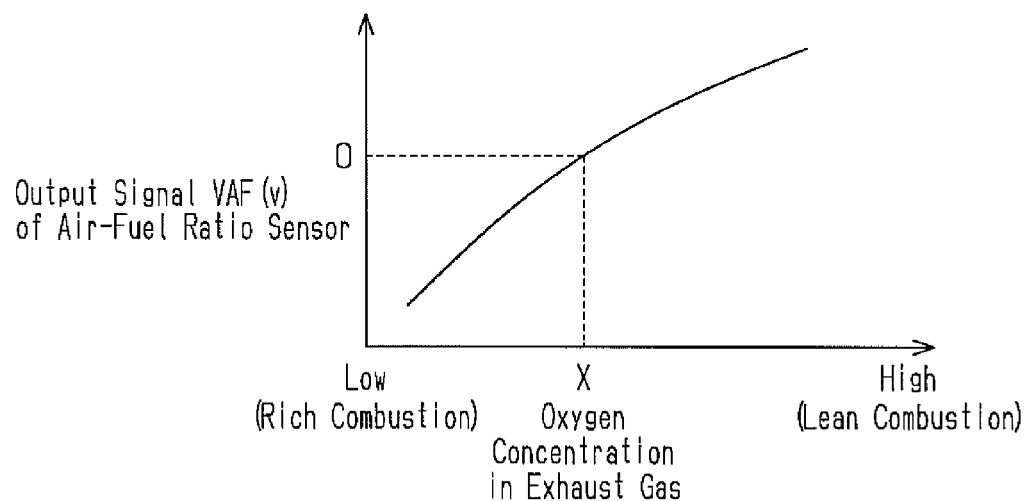
FIG. 2 is a graph illustrating changes in an output signal of an air-fuel ratio sensor in response to changes in the oxygen concentration in exhaust gas.

As illustrated in FIG. 2, the air-fuel ratio sensor 17 outputs linear signals depending on the oxygen concentration in the exhaust gas on the catalyst upstream side.

The lower the oxygen concentration in the exhaust gas on the catalyst upstream side, the smaller the output signal VAF of the air-fuel ratio sensor 17 becomes. When the air fuel mixture is combusted at the stoichiometric air-fuel ratio, the output signal VAF is a value of, for example, 0 v for an oxygen concentration X in the exhaust gas at the time. Thus, the oxygen concentration in the exhaust gas on the catalyst upstream side becomes lower when the air fuel mixture is combusted at a ratio richer than the stoichiometric air-fuel ratio (rich combustion), then, the output signal VAF of the air-fuel ratio sensor 17 becomes smaller than 0 v. In contrast, the oxygen concentration in the exhaust gas on the catalyst upstream side becomes higher when the air fuel mixture is combusted at a ratio leaner than the stoichiometric air-fuel ratio (lean combustion). Accordingly, the output signal VAF of the air-fuel ratio sensor 17 becomes larger than 0 v.

Figure 3:
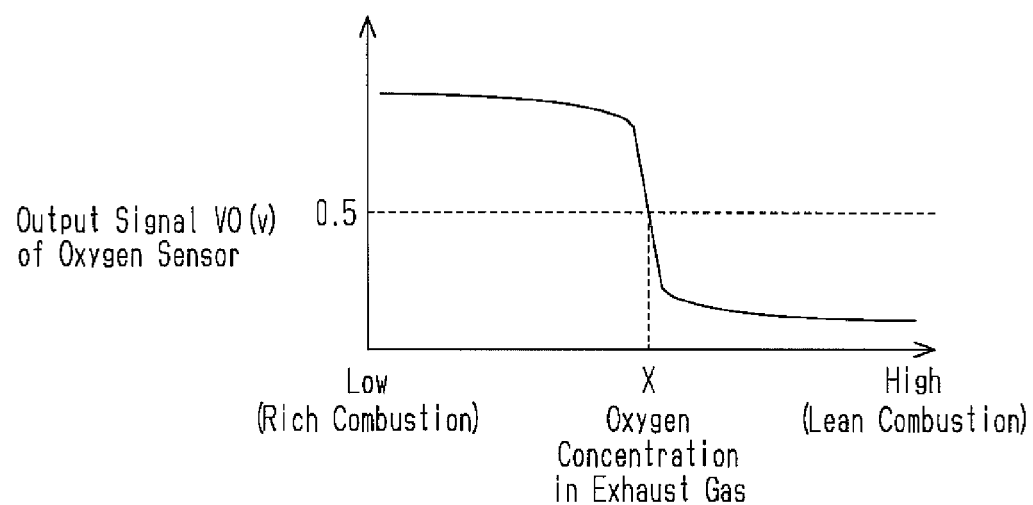
FIG. 3 is a graph illustrating changes in an output signal of an oxygen sensor in response to changes in the oxygen concentration in the exhaust gas.

As illustrated in FIG. 3, the oxygen sensor 18 outputs a rich signal or a lean signal depending on the oxygen concentration in the exhaust gas on the catalyst downstream side.

An output signal VO of the oxygen sensor 18 has a value of, for example, 0.5 v when the oxygen concentration in the exhaust gas on the catalyst downstream side is equal to the value at the time of combustion of the air fuel mixture at the stoichiometric air-fuel ratio (oxygen concentration X). As the oxygen concentration in the exhaust gas on the catalyst downstream side is higher than the oxygen concentration X as a result of the lean combustion, a value smaller than 0.5 v is output from the oxygen sensor 18 as a lean signal. When the oxygen concentration in the exhaust gas on the catalyst downstream side is higher than the oxygen concentration X, the lean signal shows rapid changes to smaller values than 0.5 v as the oxygen concentration increases in the vicinity of the oxygen concentration X. However, once the oxygen concentration moves away from the vicinity of the oxygen concentration X, the rapid changes of the lean signal to smaller values according to the increase of the oxygen concentration start to slow down.

When the oxygen concentration in the exhaust gas on the catalyst downstream side is lower than the oxygen concentration X as a result of the rich combustion, a value larger than 0.5 v is output from the oxygen sensor 18 as a rich signal. When the oxygen concentration in the exhaust gas on the catalyst downstream side is lower than the oxygen concentration X, the rich signal shows a rapid change to larger values than 0.5 v as the oxygen concentration decreases in the vicinity of the oxygen concentration X. However, once the oxygen concentration moves away from the vicinity of the oxygen concentration X, the rapid changes of the rich signal to larger values according to the decrease of the oxygen concentration start to slow down.

An electric configuration of the catalyst degradation detection device according to the present embodiment will be described below referring to FIG. 1.

An air-fuel controller has an electronic controller 21 for performing various controls of the engine 1. The electronic controller 21 includes a CPU for performing various computations associated with the engine controls, a ROM, which stores programs and data necessary for the engine controls, a RAM, which temporarily stores computation results by the CPU, and output and input ports for outputting and inputting signals to and from the outside.

The air-fuel ratio sensor 17 and the oxygen sensor 18, and sensors described below are connected to the input ports of the electronic controller 21:

an accelerator position sensor 28, which detects the degree of depression (accelerator pressing degree) of an accelerator pedal 27 depressed by the driver of then automobile;

a throttle position sensor 30, which detects the opening degree (throttle opening degree) of the throttle valve 13 provided in the air intake passage 3;

an airflow meter 32, which detects the amount of air drawn into the combustion chamber 2 through the air intake passage 3;

an air intake pressure sensor 33, which detects a pressure (air intake pressure) on the downstream side of the throttle valve 13 in the air intake passage 3; and a crank position sensor 34, which outputs a signal corresponding to the rotation of the crankshaft 7 used to calculate the engine speed.

To the output ports of the electronic controller 21 are connected drive circuits of the fuel injection valve 4, the ignition plug 5, and the throttle valve 13.

The electronic controller 21 grasps an engine operating condition, for example, the engine speed and engine load (the amount of air drawn into the combustion chamber 2 per cycle of the engine 1), on the basis of detection signals input thereto from the various sensors. The engine speed is calculated on the basis of the detection signal output from the crank position sensor 34. The engine load is calculated from the engine speed and air intake amount of the engine 1 calculated on the basis of the detection signals output from the accelerator position sensor 28, the throttle position sensor 30, and the airflow meter 32. The electronic controller 21 outputs command signals to the various drive circuits connected to the output ports in accordance with the engine operating condition such as the engine load and the engine speed. As described so far, control of fuel injection amount, ignition timings and air intake amount of the engine 1 is performed through the electronic controller 21.

The stoichiometric air-fuel ratio control for effectively purifying the exhaust gas of the engine 1 using the three-way catalyst of the catalyst converter 16 is performed by regulating the fuel injection amount on the basis of the output signal VAF of the air-fuel ratio sensor 17 and the output signal VO of the oxygen sensor 18. More specifically, the fuel injection amount of the engine 1 is increased or decreased on the basis of the output signal VAF of the air-fuel ratio sensor so that the output signal VAF is equal to a value at the time of combustion of the air fuel mixture in the combustion chamber 2 of the engine 1 at the stoichiometric air-fuel ratio (0 v in this example). Accordingly, the air-fuel ratio of the air fuel mixture in the combustion chamber 2 of the engine 1, while fluctuating in a rich-lean-rich-lean sequence, is controlled to finally converge to the stoichiometric air-fuel ratio. However, when the fuel injection amount is regulated according to the output signal VAF of the air-fuel ratio sensor 17 alone, there is still a risk that a fluctuation center when the air-fuel ratio of the engine fluctuates in a rich-lean-rich-lean sequence to converge to the stoichiometric air-fuel ratio as described above deviates from the stoichiometric air-fuel ratio due to, for example, manufacturing variability of the air-fuel ratio sensor 17. To correct such a deviation, the fuel injection amount of the engine 1 regulated according to the output signal VAF of the air-fuel ratio sensor 17 is further regulated according to the signal output from the oxygen sensor 18 to ensure that the rich-lean-rich-lean fluctuation of the air-fuel ratio in the engine 1 is centered on the stoichiometric air-fuel ratio.

Next, a description will be given of how to determine whether the three-way catalyst of the catalyst converter 16 has degraded according to the present embodiment.

The determination on whether the three-way catalyst has degraded uses the fact that the oxygen storage function of the catalyst increasingly declines as the three-way catalyst is degraded. The maximum value of the amount of oxygen stored in the catalyst, which is determined by the oxygen storage function of the three-way catalyst (hereinafter, referred to as oxygen storage amount), is calculated, and whether the catalyst has degraded is determined on the basis of the calculated oxygen storage amount.

To measure the oxygen storage amount, active air-fuel ratio control is performed, in which a rich-lean-rich-lean change is forced to occur at predetermined intervals in the air-fuel ratio of the air fuel mixture in the combustion chamber 2 of the engine 1. When the air-fuel ratio of the engine 1 is changed from rich to lean or from lean to rich by the active air-fuel ratio control, a corresponding change occurs in the output signal VAF of the air-fuel ratio sensor 17. During a period from the occurrence of the change in the output signal VAF of the air-fuel ratio sensor 17 to the occurrence of the change corresponding to the change of the air-fuel ratio in the output signal VO of the oxygen sensor 18, the amount of oxygen stored in the three-way catalyst or the amount of oxygen desorbed from the three-way catalyst is calculated. When the forced change of the air-fuel ratio is the rich-to-lean change, oxygen is stored in the three-way catalyst during the above-mentioned period. Then, the amount of oxygen stored in the three-way catalyst during the period is calculated, and the calculated oxygen amount is used as the oxygen storage amount of the catalyst. When the forced change of the air-fuel ratio is the lean-to-rich change, on the other hand, oxygen is desorbed from the three-way catalyst during the above-mentioned period. Then, the amount of oxygen desorbed from the three-way catalyst is calculated during the period, and the calculated oxygen amount is used as the oxygen storage amount of the catalyst.

To determine whether the three-way catalyst has degraded, the oxygen storage amount calculated at the end of the period may be compared to a threshold value for degradation assessment. At least one of a value obtained by causing the rich-to-lean change in the air-fuel ratio (oxygen storage amount OSC1 obtained at the time of oxygen storage) and a value obtained by causing the lean-to-rich change in the air-fuel ratio (oxygen storage amount OSC2 obtained at the time of oxygen desorption) can be used as the oxygen storage amount for determining whether the three-way catalyst has degraded. When the oxygen storage amount thus obtained for determining the degradation is smaller than the threshold value, it may be determined that degradation of the oxygen storage function due to degradation of the three-way catalyst occurs, therefore, determination that the catalyst has degraded can be made. When the oxygen storage amount is equal to or larger than the threshold value, on the other hand, it may be determined that degradation of the oxygen storage function due to degradation of the three-way catalyst do not occur, therefore, determination that the catalyst is not yet degraded (normal) can be made.

Whether the three-way catalyst has degraded is preferably determined at least once from the startup to the end of operation of the engine 1. After completing the determination of whether the three-way catalyst has degraded, the oxygen storage amount calculated for the determination is reset to 0.

The calculation of the oxygen storage amount during the active air-fuel ratio control will now be described referring to FIGS. 4 and 5.

The active air-fuel ratio control starts when all of conditions for execution are met: determination of whether the three-way catalyst has degraded has never been completed after the startup of the engine 1, the engine 1 is in steady operation within a predetermined engine operational range for degradation assessment, and the three-way catalyst has a temperature in a range of activation temperatures. Further, during the execution of the active air-fuel ratio control, in the case where any one of the conditions for execution is not met or the calculation and measurement of various values for the purpose of executing the active air-fuel ratio control is completed, the active air-fuel ratio control under execution is suspended.

When the rich-to-lean change is forced to occur in the air-fuel ratio of the engine 1 at the point in time t1 illustrated in FIG. 4(*a*) during the active air-fuel ratio control, the output signal VAF of the air-fuel ratio sensor 17 increases according to the rich-to-lean change as illustrated in FIG. 4(*b*) (t2). At the point in time t2 of the drawing and thereafter, exhaust gas with a high oxygen concentration passes through the three-way catalyst as a result of the rich-to-lean change of the air-fuel ratio. Since oxygen in the exhaust gas is stored in the three-way catalyst, the oxygen concentration in the exhaust gas on the catalyst downstream side stays low during the storage. Therefore, a change corresponding to the rich-to-lean change of the air-fuel ratio does not occur in the output signal VO of the oxygen sensor 18 as illustrated with a solid line in FIG. 4(*d*). When oxygen is no longer stored in the three-way catalyst and the exhaust gas with a high oxygen concentration starts to flow on the catalyst downstream side, a change corresponding to the rich-to-lean change of the air-fuel ratio occurs in the output signal VO of the oxygen sensor 18. Whether a change corresponding to the rich-to-lean change of the air-fuel ratio has occurred in the output signal VO of the oxygen sensor 18 can be determined on the basis of whether the output signal VO has reached a lean determination value HL provided to determine the occurrence of such a change. When the output signal VO reaches the lean determination value HL (t3) described above, the lean-to-rich change is forced to occur in the air-fuel ratio of the engine 1.

During a period from the occurrence of the rich-to-lean change of the air-fuel ratio in the output signal VAF of the air-fuel ratio sensor 17 to the occurrence of the change corresponding to the rich-to-lean change of the air-fuel ratio in the output signal VO of the oxygen sensor 18 (t2-t3), the total value of the amount of oxygen stored in the catalyst represents the maximum value of the amount of oxygen stored in the three-way catalyst (oxygen storage amount). The oxygen storage amount is obtained during the period (t2-t3) as described below. That is, during the period (t2-t3), an oxygen storage amount ΔOSC is calculated by expression (1) below as the amount of oxygen stored in the three-way catalyst per extremely short period of time.

$$\Delta OSC = (\Delta A/F) \cdot Q \cdot K \quad (1)$$

ΔOSC: oxygen storage amount per extremely short period of time
ΔA/F: air-fuel ratio difference
Q: fuel injection amount
K: oxygen ratio The air-fuel ratio difference ΔA/F of expression (1) represents the absolute value of a value obtained by subtracting the stoichiometric air-fuel ratio from the air-fuel ratio calculated on the basis of the output signal VAF of the air-fuel ratio sensor 17. The fuel injection amount Q of expression (1) represents the fuel injection amount of the engine 1, which is the basis of the air-fuel ratio calculated on the basis of the output signal VAF of the air-fuel ratio sensor 17, meaning that the fuel injection amount Q is the amount of fuel injected from the fuel injection valve 4. The oxygen ratio K of expression (1) represents the ratio of oxygen contained in air. In the given example, a fixed value, for example, 0.23, is used as the oxygen ratio K. The oxygen storage amount ΔOSC per extremely short period of time calculated by expression (1) is integrated during the period (t2-t3), and a value obtained by the integration is used as the amount of oxygen stored in the three-way catalyst. Therefore, the integrated value thus obtained at the end of the period (t2-t3) is the maximum value of the amount of oxygen that can be stored in the three-way catalyst (oxygen storage amount). The oxygen storage amount thus obtained is an oxygen storage amount OSC1 obtained at the time of oxygen storage in the three-way catalyst.

When the lean-to-rich change is forced to occur in the air-fuel ratio of the engine 1 at the point in time t5 illustrated in FIG. 5(*a*) during the active air-fuel ratio control, the output signal VAF of the air-fuel ratio sensor 17 decreases according to the change as illustrated in FIG. 5(*b*) (t6). The lean-to-rich change of the air-fuel ratio is forced to occur when, for example, the output signal VO of the oxygen sensor 18 reaches the lean determination value HL (t3 in FIG. 4) as described above. At the point in time t5 of FIG. 5 and thereafter, exhaust gas with a low oxygen concentration passes through the three-way catalyst as a result of the lean-to-rich change of the air-fuel ratio. Since oxygen stored in the three-way catalyst is desorbed therefrom and released into the exhaust gas, the oxygen concentration in the exhaust gas on the catalyst downstream side stays high during the desorption of oxygen from the catalyst. Therefore, a change corresponding to the lean-to-rich change of the air-fuel ratio does not occur in the output signal VO of the oxygen sensor 18 as illustrated with a solid line in FIG. 5(*d*). After all of oxygen stored in the three-way catalyst is exhausted with no oxygen left to be released into the exhaust gas, and therefore the exhaust gas with a low oxygen concentration starts to flow on the catalyst downstream side, a change corresponding to the lean-to-rich change of the air-fuel ratio occurs in the output signal VO of the oxygen sensor 18. Whether a change corresponding to the lean-to-rich change of the air-fuel ratio has occurred in the output signal VO of the oxygen sensor 18 can be determined on the basis of whether the output signal VO has reached a rich determination value HR provided to determine the occurrence of such a change. When the output signal VO reaches the rich determination value HR (t7) as described above, the rich-to-lean change is forced to occur in the air-fuel ratio of the engine 1.

During a period from the occurrence of the lean-to-rich change of the air-fuel ratio in the output signal VAF of the air-fuel ratio sensor 17 to the occurrence of the change corresponding to the lean-to-rich change of the air-fuel ratio in the output signal VO of the oxygen sensor 18 (t6-t7), a total value of the amount of oxygen desorbed from the catalyst represents the maximum value of the amount of oxygen stored in the three-way catalyst (oxygen storage amount). The oxygen storage amount is obtained during the period (t6-t7) in a manner similar to the period of t2-t3 in FIG. 4. That is, during the period (t6-t7), the oxygen storage amount ΔOSC is calculated by expression (1) as the amount of oxygen stored in the three-way catalyst per extremely short period of time. The oxygen storage amount ΔOSC per extremely short period of time calculated by expression (1) is integrated during the period (t6-t7), and a value obtained by the integration is used as the amount of oxygen desorbed from the three-way catalyst. Therefore, the integrated value at the end of the period (t6-t7) is the maximum value of the amount of oxygen that can be stored in the three-way catalyst (oxygen storage amount). The oxygen storage amount thus obtained is an oxygen storage amount OSC2 at the time of oxygen desorption from the three-way catalyst.

The active air-fuel ratio control is terminated after the oxygen storage amount necessary for determining whether the three-way catalyst has degraded is obtained. That is, when the oxygen storage amount necessary for determining whether the three-way catalyst has degraded is one of the oxygen storage amount OSC1 and the oxygen storage amount OSC2, the active air-fuel ratio control ends after one of the oxygen storage amounts is obtained. When the oxygen storage amount OSC1 and the oxygen storage amount OSC2 are both needed to determine whether the three-way catalyst has degraded, the active air-fuel ratio control ends after these oxygen storage amounts are obtained.

To determine whether the three-way catalyst has degraded on the basis of the oxygen storage amount, the obtained oxygen storage amount may deviate from a correct value under the influence form deterioration of responsiveness of a change in the output signal VO of the oxygen sensor 18 in response to the change in the oxygen concentration in the exhaust gas on the catalyst downstream side.

When, for example, deterioration of the responsiveness of the oxygen sensor 18 is exhibited in the output signal VO of the sensor 18 in the form of a change from transition illustrated with a solid line to transition illustrated with a line formed by a long dash alternating with two short dashes L1 in FIG. 4(d), the period during which the oxygen storage amount is calculated, which is originally t2-t3, becomes longer to t2-t4. Then, the oxygen storage amount OSC1 calculated at the end of the period (t2-t4) results in a too large value (value at the point in time t4) as illustrated with a line formed by a long dash alternating with two short dashes in FIG. 4(c) relative to the correct value (value at the point in time t3). When deterioration of the responsiveness of the oxygen sensor 18 is exhibited in the output signal VO of the sensor 18 in the form of a change from transition illustrated with a solid line to transition illustrated with a line formed by a long dash alternating with two short dashes L4 in FIG. 5(d), the period during which the oxygen storage amount is calculated, which is originally t6-t7, becomes longer to t6-t8. Then, the oxygen storage amount OSC2 calculated at the end of the period (t6-t8) results in a too large value (value at the point in time t8) as illustrated with a line formed by a long dash alternating with two short dashes in FIG. 5(c) relative to the correct value (value at the point in time t7). When determining whether the three-way catalyst has degraded on the basis of the oxygen storage amount thus deviated from the correct value, a determination result thus obtained may be incorrect.

The present embodiment, therefore, measures the responsiveness of the change in the output signal VO of the oxygen sensor 18 in response to the change in the oxygen concentration in the exhaust gas on the catalyst downstream side. When at least one of the responsiveness of the oxygen sensor 18 at the time of the lean-to-rich change of the air-fuel ratio and the responsiveness of the oxygen sensor 18 at the time of the rich-to-lean change of the air-fuel ratio in the engine 1 is measured, the oxygen storage amount used to determine whether the three-way catalyst has degraded is corrected on the basis of the measured responsiveness. More specifically, the oxygen storage amount used to determine whether the three-way catalyst has degraded is directly corrected to decrease on the basis of the measured responsiveness in such a manner that the oxygen storage amount is more largely reduced as the measured responsiveness is worsened as compared to a reference value. This prevents deviation of the corrected oxygen storage amount used to determine whether the three-way catalyst has degraded from the correct value as a result of deterioration of the responsiveness of the oxygen sensor 18. Then, whether the three-way catalyst has degraded is determined on the basis of the corrected oxygen storage amount. Therefore, the determination can be accurate regardless of whether the responsiveness of the oxygen sensor 18 has been deteriorated. The measured responsiveness of the oxygen sensor 18 is cleared after completing the determination of whether the three-way catalyst has degraded based on the corrected oxygen storage amount.

More specifically, the measurement of the responsiveness of the oxygen sensor 18 may perform as described below. That is, when the air-fuel ratio of the engine 1 changes from rich to lean or from lean to rich and a change corresponding to the change occurs in the output signal VO of the oxygen sensor 18, a response time from a time point when the output signal VO starts to change to a time point when the output signal VO reaches the lean determination value HL or the rich determination value HR is measured as a value representing the responsiveness. The response time thus measured results in a larger value as the responsiveness is worsened. As the response time is larger as compared to values when the responsiveness of the oxygen sensor 18 is not deteriorated (corresponding to the reference value), the oxygen storage amount used to determine whether the three-way catalyst has degraded is more largely corrected to decrease.

Figure 6:
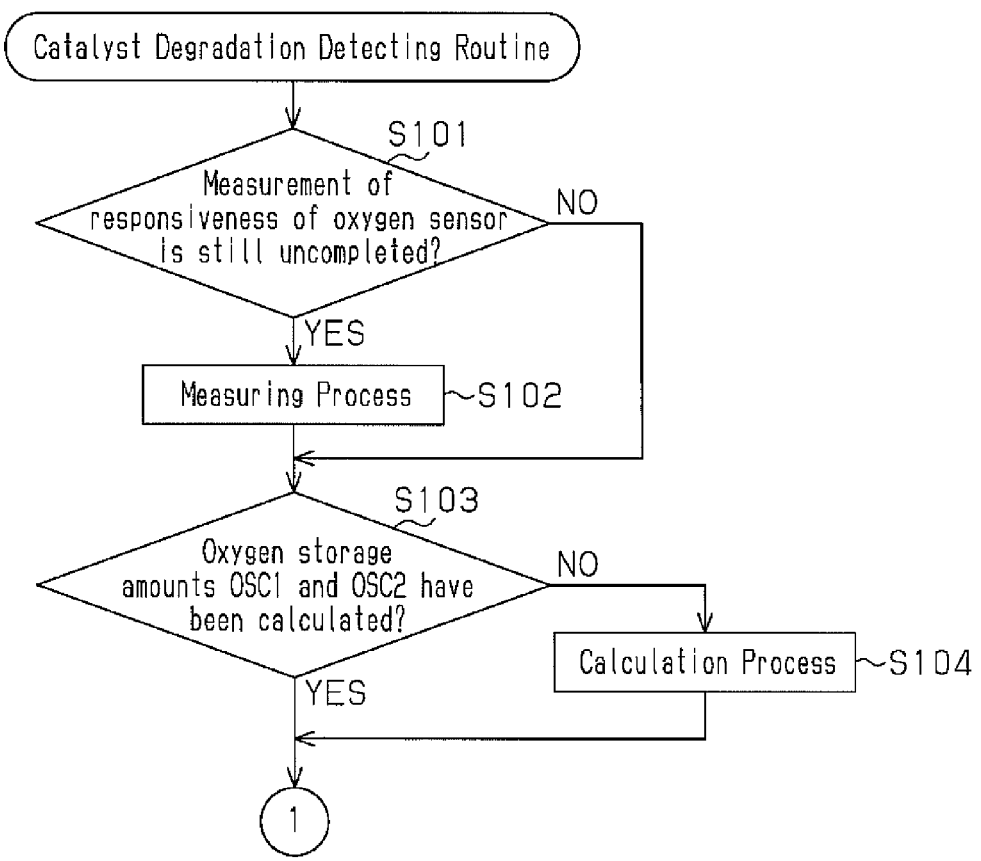
FIG. 6 is a flowchart illustrating process for determining whether a three-way catalyst has degraded.
Figure 8A:
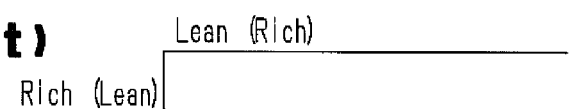
FIGS. 8(a) to 8(d) are timing charts illustrating conventional examples of changes in the air-fuel ratio of an engine, an output signal of a catalyst upstream sensor, an obtained oxygen storage amount, and an output signal of a catalyst downstream sensor during active air-fuel ratio control, respectively.
Figure 8B:
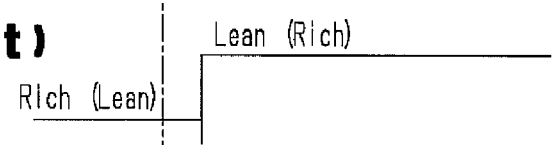
Figure 8C:
Figure 8D:
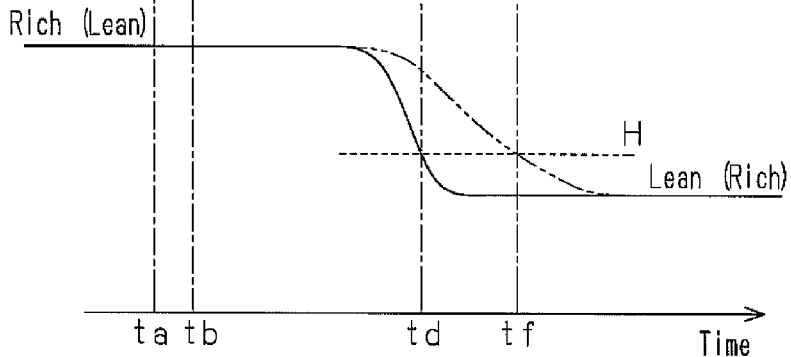

Next, specific steps for determining whether the three-way catalyst has degraded will be described referring to flowcharts of a catalyst degradation detecting routine illustrated in FIGS. 6 and 7. The catalyst degradation detecting routine is periodically carried out by time interruption at given time intervals through the electronic controller 21.

The routine starts with process for measuring the responsiveness of the oxygen sensor 18 (S101, S102 in FIG. 6) and then process for calculating the oxygen storage amounts OSC1 and OSC2 (S103, S104). The electronic controller 21 functions as a measuring unit when carrying out the process for measuring the responsiveness of the oxygen sensor 18 and functions as a calculating unit when carrying out the process for calculating the oxygen storage amounts OSC1 and OSC2.

To accurately determine whether the three-way catalyst has degraded, the oxygen storage amounts OSC1 and OSC2 used for the determination are each preferably corrected depending on the responsiveness of the oxygen sensor 18 as described below. That is, the oxygen storage amount OSC1 (value obtained at the time of oxygen storage) is corrected on the basis of the responsiveness of the rich-to-lean change in the output signal VO of the oxygen sensor 18, while the oxygen storage amount OSC2 (value obtained at the time of oxygen desorption) is corrected on the basis of the responsiveness of the lean-to-rich change in the output signal VO of the oxygen sensor 18. Then, whether the three-way catalyst has degraded is determined on the basis of both the corrected oxygen storage amounts OSC1 and OSC2. It is preferable to make a determination result more accurate.

In the process for measuring responsiveness of the oxygen sensor 18 (S101, S102), the responsiveness of the rich-to-lean change and the responsiveness of the lean-to-rich change in the output signal VO of the oxygen sensor 18 are both measured. More specifically, it is determined in the process of S101 whether the measurement of the responsiveness of the rich-to-lean change or the responsiveness of the lean-to-rich change of the oxygen sensor 18 is still uncompleted. In the case of YES in this step, it is determined that at least one of the measurements of the responsiveness of the rich-to-lean change and the responsiveness of the lean-to-rich change has not been completed yet. Then, the process of (S102) for measuring the responsiveness of which the measurement is still uncompleted is carried out.

The process of S102 executes the active air-fuel ratio control for the purpose of measuring the responsiveness of the oxygen sensor 18 when the conditions for control execution are met. During the active air-fuel ratio control, the rich-to-lean responsiveness of the oxygen sensor 18 is measured when the rich-to-lean change is forced to occur in the air-fuel ratio of the engine 1, while the lean-to-rich responsiveness of the oxygen sensor 18 is measured when the lean-to-rich change is forced to occur in the air-fuel ratio of the engine 1. When the responsiveness of the oxygen sensor 18 is measured not only during the execution of the active air-fuel ratio control but also in every possible opportunity, the measurement can be promptly completed. An example of the opportunity where the responsiveness can be measured other than during the execution of the active air-fuel ratio control is when the rich-to-lean change occurs in the air-fuel ratio of the engine 1 after the fuel injection from the fuel injection valve 4 is suspended by fuel cutoff control of the engine 1. The suspension of the fuel injection by the fuel cutoff control is very frequently carried out compared to the execution of the active air-fuel ratio control with the conditions for execution being met. The process of S102 measures the rich-to-lean responsiveness of the oxygen sensor 18 in response to the rich-to-lean change of the air-fuel ratio in the engine 1 resulting from the suspension of the fuel injection by the fuel cutoff control other than during the execution of the control.

After the process for measuring the responsiveness of the oxygen sensor 18 is carried out (S101, S102), the process for calculating the oxygen storage amounts OSC1 and OSC2 (S103, S104) is carried out. That is, it is determined in the process of S103 whether the oxygen storage amounts OSC1 and OSC2 have both been calculated. In the case of NO in this step, one of the oxygen storage amounts OSC1 and OSC2 that has not been yet calculated is calculated (S104).

The calculation of S109 executes the active air-fuel ratio control for the purpose of calculating the oxygen storage amounts OSC1 and OSC2 when the conditions for the control execution are met. During the active air-fuel ratio control, the oxygen storage amount OSC1 is calculated as the oxygen storage amount at the time of oxygen storage in the three-way catalyst when the rich-to-lean change is forced to occur in the air-fuel ratio of the engine 1. During the active air-fuel ratio control, the oxygen storage amount OSC2 is calculated as the oxygen storage amount at the time of oxygen desorption from the three-way catalyst when the lean-to-rich change is forced to occur in the air-fuel ratio of the engine 1.

To accurately determine whether the three-way catalyst has degraded, it is preferable to determine whether the three-way catalyst has degraded on the basis of both the oxygen storage amount OSC1 corrected on the basis of the rich-to-lean responsiveness of the oxygen sensor 18 and the oxygen storage amount OSC2 corrected on the basis of the lean-to-rich responsiveness of the oxygen sensor 18 as described earlier. However, it is inevitably time-consuming to determine whether the three-way catalyst has degraded in this manner because it takes a large amount of time to complete both the measurements; measuring the rich-to-lean responsiveness of the oxygen sensor 18 used to correct the oxygen storage amount OSC1 and measuring the lean-to-rich responsiveness of the oxygen sensor 18 used to correct the oxygen storage amount OSC2.

Specifically, when the rich-to-lean responsiveness and the lean-to-rich responsiveness of the oxygen sensor 18 are both measured, it is likely that one of the rich-to-lean responsiveness and the lean-to-rich responsiveness is more frequently measured than the other. This may create such a situation where one of the measurements of the rich-to-lean responsiveness and the lean-to-rich responsiveness of the oxygen sensor 18 fails to be measured by the time when the other measurement is completed, requiring a great deal of time to complete the responsiveness measurements. In the present embodiment, it is likely to create such a situation where although the measurement of the rich-to-lean responsiveness of the oxygen sensor 18 is promptly completed, the measurement of the lean-to-rich responsiveness of the oxygen sensor 18 cannot be completed. It is because the fuel injection suspension by the fuel cutoff control, which only enables the rich-to-lean responsiveness to be measured, is very frequently carried out, while the execution frequency of the active air-fuel ratio control, which enables both the rich-to-lean responsiveness and the lean-to-rich responsiveness to be measured, is relatively low.

Under the aforementioned circumstances, the catalyst degradation detecting routine carries out the following process, which follows S105 (FIG. 7) to speedily determine whether the three-way catalyst has degraded. The process sequentially performed starts with determining whether one of the measurements of the rich-to-lean responsiveness and the lean-to-rich responsiveness has been completed (S105). In the case of YES in this step, it is then determined whether the calculation of the oxygen storage amount (OSC1 or OSC2) corresponding to the responsiveness of the oxygen sensor 18 already measured has been completed (S106). In the case of YES again in this step, an accelerated determination process (S107) is carried out to promptly complete the determination of whether the three-way catalyst has degraded.

In the accelerated determination process (S107), the relevant oxygen storage amount is corrected on the basis of one of the rich-to-lean responsiveness and the lean-to-rich responsiveness of the oxygen sensor 18 that has already been measured. Then, the corrected oxygen storage amount is compared to the predetermined threshold value to determine whether the three-way catalyst has degraded. Specifically, it is determined that the three-way catalyst has degraded (abnormal) when the corrected oxygen storage amount is smaller than the threshold value, whereas it is determined that the three-way catalyst has not degraded (normal) when the corrected oxygen storage amount is equal to or larger than the threshold value. If one of the rich-to-lean responsiveness and the lean-to-rich responsiveness of the oxygen sensor 18 is measured, the oxygen storage amount can be corrected on the basis of the measured responsiveness, and the corrected oxygen storage amount can be used to determine whether the three-way catalyst has degraded. Therefore, it is not as time-consuming to complete the determination of whether the three-way catalyst has degraded as to measure both the rich-to-lean responsiveness and the lean-to-rich responsiveness of the oxygen sensor 18 for the determination. Therefore, the determination of whether the catalyst has degraded can be promptly completed.

In the case of NO in S105, it is determined whether the rich-to-lean responsiveness and the lean-to-rich responsiveness of the oxygen sensor 18 both have already been measured (S108). In the case of YES by determining that the two measurements have already been completed, it is determined whether the oxygen storage amount OSC1 and the oxygen storage amount OSC2 both have already been calculated (S109). In the case of NO in this step, it is determined whether one of the oxygen storage amount OSC1 and the oxygen storage amount OSC2 has already been calculated (S110). In the case of YES in S110 by determining that one of the oxygen storage amounts OSC1 and OSC2 has already been measured, the accelerated determination process (S107) is carried out. Then, the oxygen storage amount (OSC1 or OSC2) already calculated is corrected on the basis of the relevant responsiveness of the oxygen sensor 18. Then, the corrected oxygen storage amount is compared to the threshold value to determine whether the three-way catalyst has degraded in a manner similar to the above.

In the case of YES in S109 by determining that the calculation of the oxygen storage amount OSC1 and the calculation of the oxygen storage amount OSC2 are both completed, a normal determination process (S111) is carried out to determine accurately whether the three-way catalyst has degraded. The normal determination process (S111) corrects the oxygen storage amount OSC1 on the basis of the rich-to-lean responsiveness of the oxygen sensor 18 and also corrects the oxygen storage amount OSC2 on the basis of the lean-to-rich responsiveness of the oxygen sensor 18. Then, whether the three-way catalyst has degraded is determined on the basis of both the corrected oxygen storage amounts OSC1 and OSC2.

More specifically, the corrected oxygen storage amount OSC1 is compared to the threshold value, and the corrected oxygen storage amount OSC2 is compared to the threshold value. When the corrected oxygen storage amount OSC1 is smaller than the threshold value or the corrected oxygen storage amount OSC2 is smaller than the threshold value, it is determined that the three-way catalyst has degraded. When the corrected oxygen storage amount OSC1 is equal to or larger than the threshold value and the corrected oxygen storage amount OSC2 is equal to or larger than the threshold value, it is determined that the three-way catalyst has not degraded (normal). When whether the three-way catalyst has degraded is determined in this manner, a determination result thus obtained is accurate.

The electronic controller 21, which executes the accelerated determination process and the normal determination process, functions as a correcting unit and a determining unit.

According to the present embodiment described so far, the following advantages are obtained.

(1) Whether the three-way catalyst has degraded is determined on the basis of the maximum value of the amount of oxygen stored in the catalyst (oxygen storage amount). To determine whether the three-way catalyst has degraded, the oxygen storage amount is obtained, and the responsiveness of a change in the output signal VO of the oxygen sensor 18 in response to the change in the oxygen concentration in the exhaust gas on the catalyst downstream side is measured. After at least one of the responsiveness of the oxygen sensor 18 when the lean-to-rich change occurs in the air-fuel ratio of the engine 1 and the responsiveness of the oxygen sensor 18 when the rich-to-lean change occurs in the air-fuel ratio is measured, the oxygen storage amount used to determine whether the three-way catalyst has degraded is corrected on the basis of the measured responsiveness. More specifically, the oxygen storage amount is corrected to decrease on the basis of the measured responsiveness of the oxygen sensor 18 in such a manner that the oxygen storage amount used to determine whether the three-way catalyst has degraded is more decreased as the measured responsiveness is worsened relative to the reference value. This prevents deviation of the corrected oxygen storage amount used to determine whether the three-way catalyst has degraded from the correct value as a result of deterioration of the responsiveness of the oxygen sensor 18. Since whether the three-way catalyst has degraded is determined on the basis of the corrected oxygen storage amount, a determination result thus obtained can be accurate even if the responsiveness of the oxygen sensor 18 is deteriorated.

(2) When only one of the measurements of the rich-to-lean responsiveness and the lean-to-rich responsiveness of the oxygen sensor 18 is completed, the accelerated determination process is carried out to promptly complete the determination of whether the three-way catalyst has degraded. In the accelerated determination process, on the basis of one of the rich-to-lean responsiveness and the lean-to-rich responsiveness of the oxygen sensor 18 that has already been measured, the relevant oxygen storage amount is corrected. Then, the corrected oxygen storage amount is compared to the predetermined threshold value to determine whether the three-way catalyst has degraded. If one of the rich-to-lean responsiveness and the lean-to-rich responsiveness of the oxygen sensor 18 is measured, the oxygen storage amount can be corrected on the basis of the measured responsiveness, and the corrected oxygen storage amount can be used to determine whether the three-way catalyst has degraded. Therefore, it is not as time-consuming to complete the determination of whether the catalyst has degraded as to measure both the rich-to-lean responsiveness and the lean-to-rich responsiveness of the oxygen sensor 18 for the determination. Therefore, the determination of whether the catalyst has degraded can be promptly completed.

(3) In the case where the rich-to-lean responsiveness and the lean-to-rich responsiveness of the oxygen sensor 18 both have already been measured, but only one of the calculations of the oxygen storage amount OSC1 and the oxygen storage amount OSC2 is completed, the accelerated determination process is also carried out. That is, the oxygen storage amount corrected on the basis of the responsiveness of the oxygen sensor 18 for the oxygen storage amount (OSC1 or OSC2) already calculated is compared to the threshold value, and whether the three-way catalyst has degraded is determined on the basis of the comparison result. When the rich-to-lean responsiveness and the lean-to-rich responsiveness of the oxygen sensor 18 both have already been measured, whether the three-way catalyst has degraded can be determined if only one of the calculations of the oxygen storage amount OSC1 and the oxygen storage amount OSC2 is completed. Therefore, it can be promptly determined whether the three-way catalyst has degraded to complete the determination even when the rich-to-lean responsiveness and the lean-to-rich responsiveness of the oxygen sensor 18 both have already been measured.

(4) When the rich-to-lean responsiveness and the lean-to-rich responsiveness of the oxygen sensor 18 both have already been measured and the oxygen storage amounts OSC1 and OSC2 both have already been calculated, the normal determination process is carried out. That is, the oxygen storage amount OSC1 corrected on the basis of the rich-to-lean responsiveness of the oxygen sensor 18 is compared to the threshold value, and the oxygen storage amount OSC2 corrected on the basis of the lean-to-rich responsiveness of the oxygen sensor 18 is compared to the threshold value. Then, whether the three-way catalyst has degraded is determined on the basis of the comparison result. Since the corrected values of the oxygen storage amounts OSC1 and OSC2 are both used to determine whether the three-way catalyst has degraded, the determination result thus obtained is accurate.

(5) In the normal determination process, it is determined that the three-way catalyst has not degraded (normal) when the corrected value of the oxygen storage amount OSC1 is equal to or larger than the threshold value and the corrected value of the oxygen storage amount OSC2 is equal to or larger than the threshold value. On the other hand, it is determined that the three-way catalyst has degraded when the corrected value of the oxygen storage amount OSC1 is smaller than the threshold value or the corrected value of the oxygen storage amount OSC2 is smaller than the threshold value. By thus strictly determining whether the three-way catalyst has degraded, it is immediately determined that the three-way catalyst has degraded once the degradation actually starts.

The present embodiment described so far may be modified as follows.

The normal determination process may suspend the determination of whether the three-way catalyst has degraded undetermined when one of the oxygen storage amounts OSC1 and OSC2 is smaller than the threshold value but the other is equal to or larger than the threshold value, while determining that the three-way catalyst has degraded when the oxygen storage amounts OSC1 and OSC2 are both smaller than the threshold values.

The normal determination process may determine that the three-way catalyst has not degraded when at least one of the oxygen storage amounts OSC1 and OSC2 is equal to or large than the threshold value, while determining that the three-way catalyst has degraded when the oxygen storage amounts OSC1 and OSC2 are both smaller than the threshold values.

The process of S111 in the catalyst degradation detecting routine illustrated in FIG. 8 (normal determination process) may be omitted.

The process of S110 in the catalyst degradation detecting routine illustrated in FIG. 8 may be omitted.

The steps S111 and S110 may be both omitted. In this case, the steps S108 and S109 illustrated in FIG. 7, which accordingly become unnecessary, are also omitted.

An air-fuel ratio sensor may be provided as the catalyst downstream sensor in place of the oxygen sensor 18.

An oxygen sensor may be provided as the catalyst upstream sensor in place of the air-fuel ratio sensor 17.

DESCRIPTION OF THE REFERENCE NUMERALS

1 Engine
2 Combustion chamber
3 Air intake passage
4 Fuel injection valve
5 Ignition plug
6 Piston
7 Crankshaft
8 Exhaust passage
13 Throttle valve
16 Catalyst converter
17 Air-fuel ratio sensor
18 Oxygen sensor
21 Electronic controller
27 Accelerator pedal
28 Accelerator position sensor
30 Throttle position sensor
32 Airflow meter
33 Air intake pressure sensor
34 Crank position sensor

The invention claimed is:

1. A catalyst degradation detection device, comprising:
a catalyst upstream sensor, which is provided on an upstream side of a catalyst in an exhaust passage of an internal combustion engine and which outputs a signal on the basis of an oxygen concentration in exhaust gas;
a catalyst downstream sensor, which is provided on a downstream side of the catalyst in the exhaust passage and which outputs a signal on the basis of the oxygen concentration in the exhaust gas;
a measuring unit, which measures a responsiveness of a change in the signal output from the catalyst downstream sensor in response to a change in the oxygen concentration in the exhaust gas on the downstream side of the catalyst;
a calculating unit, which calculates an oxygen storage amount of the catalyst by forcing at least one of a rich-to-lean change and a lean-to-rich change to occur in an air-fuel ratio of the internal combustion engine;
a correcting unit, which corrects the oxygen storage amount calculated by the calculating unit on the basis of the responsiveness measured by the measuring unit; and
a determining unit, which determines whether the catalyst has degraded on the basis of the oxygen storage amount corrected by the correcting unit,
wherein, when one of the responsiveness at the time of the lean-to-rich change in the air-fuel ratio of the internal combustion engine and the responsiveness at the time of the rich-to-lean change in the air-fuel ratio is measured by the measuring unit, the correcting unit corrects the oxygen storage amount on the basis of the measured responsiveness alone.

2. The catalyst degradation detection device according to claim 1, wherein the calculating unit:
calculates the amount of oxygen stored in the catalyst during a period from the occurrence of a change corresponding to the rich-to-lean change forced to occur in the air-fuel ratio of the internal combustion engine in the signal of the catalyst upstream sensor until the signal of the catalyst downstream sensor reaches a determination value for determining whether the change corresponding to the rich-to-lean change in the air-fuel ratio occurs in the signal, and uses the calculated oxygen amount as an oxygen storage amount at the time of oxygen storage; and
calculates the amount of oxygen desorbed from the catalyst during a period from the occurrence of a change corresponding to the lean-to-rich change forced to occur in the air-fuel ratio of the internal combustion engine in the signal of the catalyst upstream sensor until the signal of the catalyst downstream sensor reaches a determination value for determining whether the change corresponding to the lean-to-rich change in the air-fuel ratio occurs in the signal, and uses the calculated oxygen amount as an oxygen storage amount at the time of oxygen desorption,
the measuring unit:
measures a rich-to-lean responsiveness of the signal output from the catalyst downstream sensor at the time of the rich-to-lean change in the air-fuel ratio of the internal combustion engine; and
measures a lean-to-rich responsiveness of the signal output from the catalyst downstream sensor at the time of the lean-to-rich change in the air-fuel ratio of the internal combustion engine,
the correcting unit:
corrects the oxygen storage amount at the time of oxygen storage such that the worsened the rich-to-lean responsiveness of the catalyst downstream sensor relative to a reference value, the more decreased the storage amount at the time of oxygen storage becomes; and
corrects the oxygen storage amount at the time of oxygen desorption such that the worsened the lean-to-rich responsiveness of the catalyst downstream sensor relative to a reference value, the more decreased the storage amount at the time of oxygen desorption becomes, and
when only one of the measurements of the rich-to-lean responsiveness and the lean-to-rich responsiveness of the catalyst downstream sensor is completed, the determining unit compares the oxygen storage amount corrected on the basis of the measured responsiveness to a threshold value, thereby determining whether the catalyst has degraded.

3. The catalyst degradation detection device according to claim 2, wherein
when the measurements of the rich-to-lean responsiveness and the lean-to-rich responsiveness of the catalyst downstream sensor are both completed but only one of the calculation of the oxygen storage amount at the time of oxygen storage and the calculation of the oxygen storage amount at the time of oxygen desorption is completed, the determining unit compares the oxygen storage amount corrected on the basis of the responsiveness of the catalyst downstream sensor for the oxygen storage amount already calculated with the threshold value, thereby determining whether the catalyst has degraded.

4. The catalyst degradation detection device according to claim 3, wherein
when the measurements of the rich-to-lean responsiveness and the lean-to-rich responsiveness of the catalyst downstream sensor are both completed and the calculation of the oxygen storage amount at the time of oxygen storage and the calculation of the oxygen storage amount at the time of oxygen desorption are also completed, the determining unit compares a corrected value of the oxygen storage amount at the time of oxygen storage corrected on the basis of the rich-to-lean responsiveness of the catalyst downstream sensor with the threshold value and compares a corrected value of the oxygen storage amount at the time of oxygen desorption corrected on the basis of the lean-to-rich responsiveness of the catalyst downstream sensor with the threshold value, thereby determining whether the catalyst has degraded on the basis of comparison results thus obtained.

* * * * *